United States Patent [19]

Hank, Jr.

[11] 3,733,097

[45] May 15, 1973

[54] DEVICE FOR ATTACHING A HOOK TO A SPACED OBJECT

[76] Inventor: Aaron J. Hank, Jr., 3743 Devon Drive, SE, Warren, Ohio 44484

[22] Filed: Apr. 21, 1971

[21] Appl. No.: 135,899

[52] U.S. Cl. ............................294/19 R, 114/221 R
[51] Int. Cl. ...............................................A47f 13/06
[58] Field of Search ..............................294/19 R, 66; 29/203 R, 206; 81/3.8, 53.1; 114/221, 230; 119/151, 154; 306/23

[56] References Cited

UNITED STATES PATENTS

| | | | |
|---|---|---|---|
| 2,979,013 | 4/1961 | Whittall | 114/221 |
| 1,932,099 | 10/1933 | Cabana | 306/23 |

FOREIGN PATENTS OR APPLICATIONS

| | | | |
|---|---|---|---|
| 10,945 | 5/1899 | Great Britain | 306/23 |

Primary Examiner—Evon C. Blunk
Assistant Examiner—Johnny D. Cherry
Attorney—John Mahoney

[57] ABSTRACT

A device for attaching a hook to a spaced object, such as a crane, electrical transmission means, or industrial equipment. The device, however, is primarily used for mooring a boat into a dock or loading it on a trailer and consists of a head, a hook secured to the head, and a handle. The head has a pair of arms spaced at an angle to each other, each having an arcuate-shaped groove therein and a long tubular handle is provided having a projection thereon which may be inserted in the groove in either arm and when the handle is rotated it is secured to that arm. Two arms are provided which enables the hook to engage the object to be moved when the hook is in the correct position. If desired two grooves may be formed in each arm which are inclined in different directions relative to each other so that the handle may be attached to either arm, irrespective of its direction or rotation. The hook has a pointed end to engage the object to be moved and a shank portion to which a rope or cable is attached. When the hook portion engages the object to be moved, such as the eye of a boat, the handle is then removed by rotating it in a direction opposite to that to which it was applied, and the object to be displaced is moved to the desired position by a rope or cable attached to the shank of the hook. When the object is a boat, it may be moored into a dock or it may be mounted on a trailer having a winch upon which the rope or cable may be wound.

5 Claims, 9 Drawing Figures

INVENTOR
AARON J. HANK JR.
BY John Mahoney
ATTORNEY

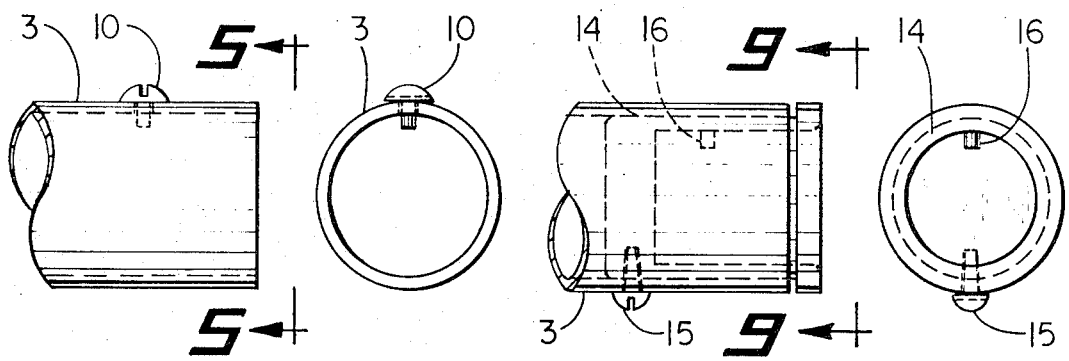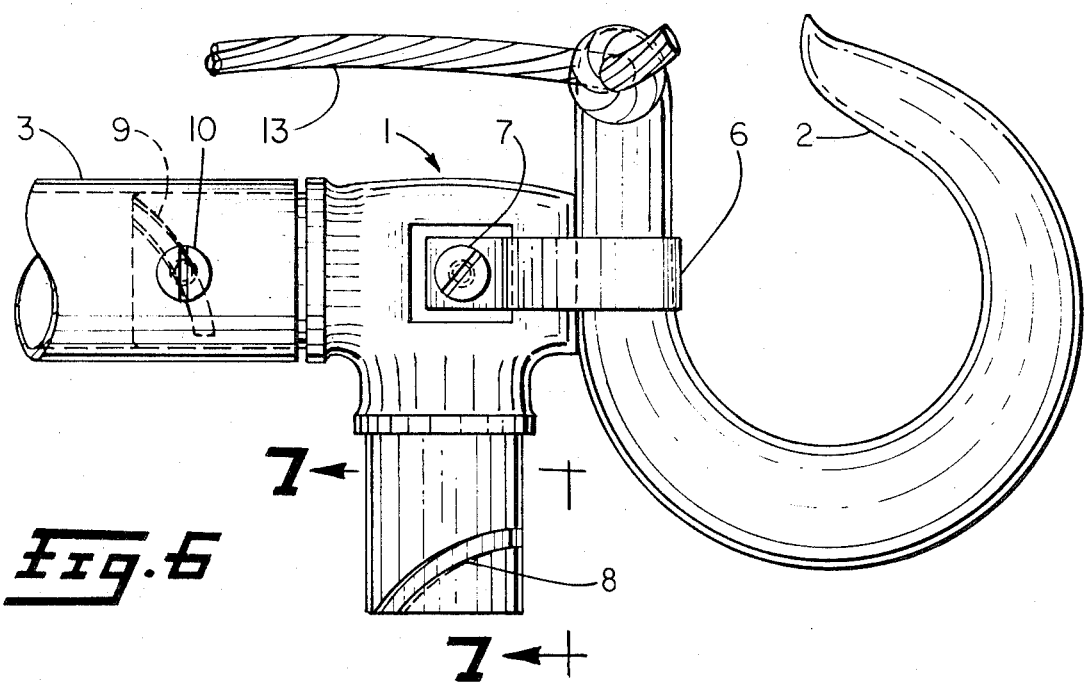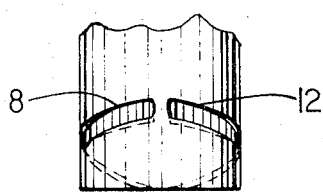

DEVICE FOR ATTACHING A HOOK TO A SPACED OBJECT

My invention relates to a device for attaching a hook to a spaced object, such as a crane, electrical transmission means, or industrial equipment of any type, to move it to a desired location. More particularly, it relates to an improved device for mooring or docking a boat, or for loading a boat on to a trailer in which case one end of a cable or rope may be secured to the shank portion of a hook having its pointed end extending through the eye of the boat and its other end secured to a winch on the trailer.

For mooring a boat to a dock, it is the usual practice to remotely attach a hook to an eye mounted on the boat. In such practice, a comparatively long handle is attached to a head for supporting one end portion of the hook and after the hook is inserted through an eye projecting from the boat, the handle is released, and a rope or cable attached to the shank portion of the hook is provided for mooring the boat into the dock.

The eye which is attached to the object to be moved, such as a boat, however, is not always arranged in the same position and it is therefore often difficult to attach the hook to the eye of the boat. According to the present invention, a head is provided which has two arms extending at an angle, such as an acute or right angle to each other, to either of which arms, a handle may be attached and either one or both arms may be provided with a slot or groove into which the free end of a projection secured to the handle extends and if desired, one or both arms of the head may be provided with two grooves into one of which a projection carried by the handle may extend so that when the handle is rotated in one direction, the handle is secured to the arm and when the projection on the screw is inserted into the other groove, the handle may be rotated in the opposite direction to also attach the handle to the arm. It will also be apparent that when the handle is secured to one of the arms of the head, the hook will be maintained in a position different than when it is secured to the other arm and because the hook may be held in different positions when the projection on the screw of the handle is rotated in the first groove of either arm, the hook may always be so positioned that it may be inserted into the eye of an object to be moved, irrespective of the position of its eye.

My invention will be better understood by reference to the accompanying drawings in which:

FIG. 4 is a fragmentary side elevational view of a portion of the handle with parts broken away and FIG. 5 is an end view thereof;

FIG. 6 is an enlarged plan view of the angularly-shaped head with a handle having parts broken away attached to the end of one of the arms of the head;

FIG. 7 is a view as seen from a plane passing through the line 7—7 of FIG. 6 to show right and left hand grooves on one of the arms of the head;

FIG. 8 is an elevational view with parts broken away of a handle having a reducing bushing to receive an arm of the head of a reduced size; and FIG. 9 is an elevational view as seen from a plane passing through the line 9—9 of FIG. 8.

Figure 1:
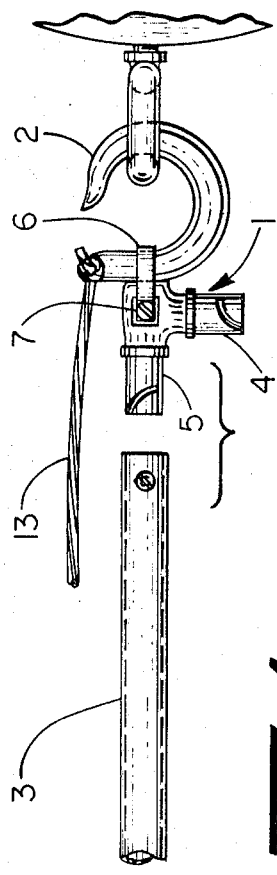
FIG. 1 is a plan view of one form of my improved device with the handle shown removed from the head of the device and the hook shown inserted in the eye of a boat, a fragmentary portion of which best is shown.
Figure 2:
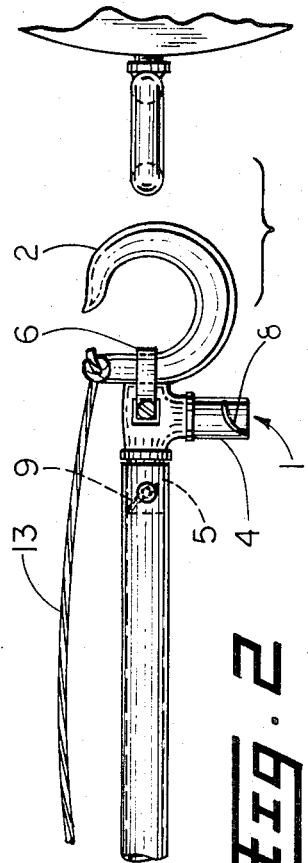
FIG. 2 is a view similar to that shown in FIG. 1 with the handle shown secured to the head of the device and with the hook arranged adjacent the eye of a boat, a fragmentary portion of which boat is shown.

As illustrated in FIGS. 1 to 7 of the drawings, my improved device includes a head 1, a hook 2, and a handle 3. The head 1 may be formed of any suitable material, such as a metal or a resin and includes two short arms 4 and 5 which are arranged at an angle to each other which is preferably a right angle. When the device is to be utilized for moving electrical transmission means, the head should be formed of a plastic material having electrical insulating properties, such as polyethylene, an acrillic resin, or a phenolic condensation product. As shown, it is provided with a central portion having an opening therein over which the opposite ends of a clamp 6 extend. The clamp is of sufficient size to extend around one end portion of the hook and its free ends may be secured together by a screw 7 which extends through the head and the opposite ends of the clamp. The clamp 6 is utilized to connect the shank end of the hook to the head and may of course vary in size depending upon the size of the hook.

The handle may be connected to either arm of the head and for this purpose, each arm is provided with an arcuate-shaped groove which preferably has substantially vertical side walls. For connecting the handle to either of the arms, a suitable screw 10 is threaded through the handle as shown more particularly in FIGS. 4 and 5 and is provided with an inner projection which is shaped to slide in either the groove 8 in one arm or the groove 9 in the other arm when the handle is rotated upon either of the respective arms in a clockwise direction.

Figure 3:
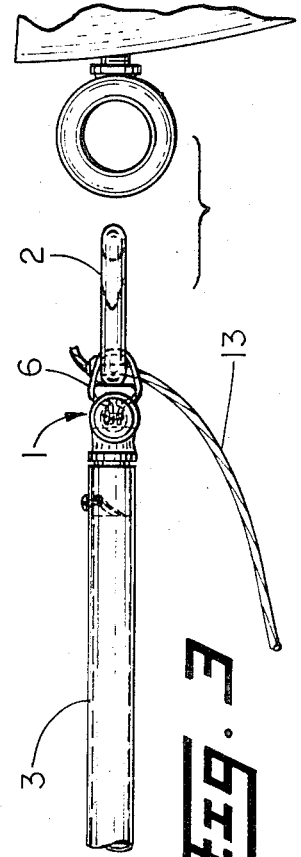
FIG. 3 is a side elevation view of FIG. 2 and shows the bent portion of the handle.

The handle may be formed of a metal, such as aluminum. When the device is utilized to move electrical transmission means, however, it must be formed of an electrical insulating material, such as fiber, or a plastic material, such as polyethylene, nylon, Teflon, an acrillic resin, or a phenolic condensation product, and to lessen its weight, the handle is preferably tubular in shape and to enable it to be easily handled, its free end portion may have a slight angle as indicated in FIG. 3 by the numeral 11.

As shown more particularly in FIGS. 4 and 5, the handle is tubular in shape and is provided in proximity to the head with a screw 10 which is threaded through the handle and has a projection thereon which extends into either the groove 8 or the groove 9 in either of the respective arms. In accordance with my invention, one or both of the arms is provided with a second arcuate-shaped groove 12 within which the shank of the screw of the handle is slidable when the handle is rotated in a counter clockwise direction, either before or after it has been released from the first groove. Because the handle may be secured to either arm of the head and the hook is attached to the head, it will be understood that the device may be moved to substantially any desired position to enable its hooked end to be inserted against a portion of an object to be moved or moored, such as the eye of a boat. See, for instance, FIG. 2 in which the hook extends in substantially the same plane as one of the arms whereas in FIG. 6 it extends in substantially the same plane as the other arm.

After the hook has been inserted within the eye of an object, such as the eye of a boat, because of the elongated shape of the groove, the handle may be quickly rotated in the desired direction to remove it from the head and a rope or cable 13 as shown in FIG. 1 to 3 and 6, one end of which is attached to the shank of the hook, serves to moor the boat to a dock, or if desired its other end may be attached to a winch or a trailer by means of which it may be loaded on the trailer.

As previously stated, the handle is preferably tubular in shape. When the inside diameter of the handle is too large to snugly fit around one of the arms of the head, its interior may be provided with a reducing bushing 14 which may be connected to the handle in any suitable manner, such as by a screw 15, and the free end portion of which bushing is provided with a projection 16, the free end portion of which is shaped to fit into the respective grooves 8, 9 or 12 of the arms when the handle is rotated so that the free end portion of the hook may be inserted into the eye of an object to be moved, irrespective of the position, such as the eye of a boat.

While the arcuate-shaped grooves in my improved device not only enables the handle to be quickly attached to and detached from the head irrespective of the material of which the head is formed, the particular form of the arcuate-shaped grooves when the head is formed of a plastic material enables the head with the arcuate-shaped grooves therein to be easily adapted to plastic injection molding techniques.

What is claimed is:

1. A device for attaching a hook to a spaced object including a head, a hook having a pointed end and a shank portion, means for securing said hook to said head, said head having a pair of arms extending outwardly therefrom at an angle to each other, each of which arms has an arcuate-shaped groove therein, a tubular handle having an inwardly extending projection thereon which is shaped to extend into and to slide in the arcuate-shaped groove of either arm to move said hook relative to said handle to a position depending upon the arm to which the handle is attached, said handle being removable from said head by rotating it in a direction opposite to the direction it was rotated when applied, and a cable connected to the shank of said hook for moving said object to a desired location after the handle is removed from said arm.

2. A device as defined in claim 1 in which said head has an aperture therein and the means for securing said hook to said head consists of a U-shaped clamp having openings in its opposite end portions and extending over the opposite sides of the opening in said head, and means passing through the openings in said clamp and the opening in said head for securing the opposite ends of the clamp together.

3. A device as defined in claim 1 in which the object to be moved is a boat having means providing an eye opening connected thereto and the angle between the arms extending from the head is substantially a right angle and the arm to which the handle is applied is such that the pointed end of the hook may be inserted through the eye of the boat before the handle is removed from the head.

4. A device as defined in claim 1 in which the angle that the arms are disposed relative to each other determines the position of the hook when the handle is attached to one or the other of the respective arms.

5. A device as defined in claim 1 in which each of said arm has first and second arcuate-shaped grooves therein, the first groove in each arm being inclined in one direction and being so shaped that the projection on said handle when positioned within the first groove will slide therein when the handle is rotated in a clockwise direction and the second groove in each arm being so inclined and shaped that when the projection on said handle is positioned within the second groove it will slide therein when the handle is rotated in a counter clockwise direction to thereby enable said handle to be connected to either of said arms irrespective of the direction of its rotation.

* * * * *